(12) United States Patent
Boney

(10) Patent No.: US 7,914,285 B2
(45) Date of Patent: Mar. 29, 2011

(54) PORTABLE APPARATUS FOR VISUALIZING AND PRACTICING WALL FINISHES

(75) Inventor: Julie K. Boney, Gibsonia, PA (US)

(73) Assignee: Knicava, LLC, Nashville, TN (US)

( * ) Notice: Subject to any disclaimer, the term of this patent is extended or adjusted under 35 U.S.C. 154(b) by 845 days.

(21) Appl. No.: 11/827,645

(22) Filed: Jul. 12, 2007

(65) Prior Publication Data

US 2008/0014561 A1    Jan. 17, 2008

Related U.S. Application Data

(60) Provisional application No. 60/830,214, filed on Jul. 12, 2006.

(51) Int. Cl.
G09B 25/00    (2006.01)

(52) U.S. Cl. .......................................... 434/72; 434/103

(58) Field of Classification Search .................... 434/72, 434/73, 74, 79, 81, 84, 96, 98, 365, 367, 434/103

See application file for complete search history.

(56) References Cited

U.S. PATENT DOCUMENTS

| | | | | |
|---|---|---|---|---|
| 2,013,741 A * | 9/1935 | Butler et al. | | 434/74 |
| 5,743,407 A * | 4/1998 | Williams | | 206/575 |
| 5,746,600 A * | 5/1998 | Chang | | 434/98 |
| 6,112,665 A * | 9/2000 | Teter et al. | | 101/483 |
| 6,270,123 B1 * | 8/2001 | Spangler | | 283/114 |
| 6,790,042 B2 * | 9/2004 | Worth | | 434/75 |
| 6,994,553 B2 * | 2/2006 | DaRif et al. | | 434/98 |
| 7,005,171 B2 * | 2/2006 | Lerner et al. | | 428/41.8 |
| 7,014,466 B2 * | 3/2006 | Cojic et al. | | 434/105 |
| 7,563,098 B2 * | 7/2009 | Whitman | | 434/98 |
| 2005/0208456 A1* | 9/2005 | Swanick | | 434/84 |

* cited by examiner

*Primary Examiner* — Kurt Fernstrom
(74) *Attorney, Agent, or Firm* — The Webb Law Firm

(57) ABSTRACT

A portable apparatus for visualizing or practicing a paint color, finish, technique, or texture includes a substrate having a primed first surface and a second surface having means for securing the substrate to a mounting surface, such as a wall. A method for visualizing and practicing a paint color, finish, technique, or texture includes the steps of (a) applying a paint color, finish, technique, or texture to a first surface of the substrate; (b) textually identifying onto the substrate the paint color, finish, technique, or texture applied thereto; (c) securing the substrate to a first portion of the mounting surface; (d) removing the substrate from the mounting surface; and (e) securing the substrate to a second portion of the mounting surface.

9 Claims, 6 Drawing Sheets

PORTABLE APPARATUS FOR VISUALIZING AND PRACTICING WALL FINISHES

CROSS REFERENCE TO RELATED APPLICATIONS

This application claims the benefit of U.S. Provisional Patent Application No. 60/830,214 filed Jul. 12, 2006, and entitled "Portable Apparatus for Visualizing and Practicing Wall Finishes," the contents of which are incorporated herein by reference.

BACKGROUND OF THE INVENTION

1. Field of the Invention

The present invention relates to visualizing and practicing finishes and, more particularly, to a portable apparatus for creating, practicing and visualizing paint colors, paint schemes, textures, other finishes, and application techniques that are intended for use on a wall or other application surfaces.

2. Description of Related Art

Currently, only limited options are available when a consumer, painter or decorator wants to determine and/or practice an appropriate paint color, finish or painting technique. For example, the individual may utilize sample paint chips from the paint manufacturer, which typically range in size from 1"×2" to 2"×2" and offer limited visual reference (as shown in prior art FIG. 1). Paint chips in and of themselves do not allow for effective comparison of techniques or finishes, and no practice palate is presently available to master paint techniques.

Alternatively, the individual may apply a proposed paint color, technique or finish on existing wall surfaces. For example, paint companies currently sell "trial size" paint bottles. However, no suitable practice palette is provided for use with the sample paints. Accordingly, the individual must mark up or destroy their existing wall surface to test the sample paint or texture. However, this requires remediation of the surface prior to final painting, once a paint or texture has finally been chosen. Additionally, an unsightly appearance is created during the testing of the sample paint. Use of this existing paint testing technique prevents portability of the suggested application for use in comparison alongside a selection of fabrics, furniture or other decor, either remote from the wall or in a showroom external to the home. Also, if the individual does not like the new color or technique, or if they are not successful in mastering a new technique, they are now committed to re-painting the wall to clean up the unsightly appearance.

A further option includes purchasing a cumbersome industry-sized gypsum board (e.g., dry wall) for application of test colors, techniques and finishes. Such a gypsum board is heavy, dirty, and has limited portability. Additionally, the gypsum board is required to be primed prior to use as an application surface. Still another option involves application to an entire wall or room and determination thereafter that the color, technique or finish is not the desired outcome. This requires reapplication, as well as incurring additional cost, effort and dissatisfaction for the individual.

SUMMARY OF THE INVENTION

Accordingly, it is an object of the present invention to overcome the disadvantages associated with the prior art by providing a portable, pre-primed, paint-ready apparatus for creating, practicing and visualizing paint colors, paint schemes, textures, other finishes, and application techniques that are intended for use on a wall or other application surface.

The present invention includes a portable apparatus for visualizing or practicing a paint color, finish, technique, or texture. The portable apparatus includes a substrate having a first and second surface. The first surface includes a primer coating adapted to receive a paint color, finish, technique, or texture thereon and the second surface includes a means for securing the substrate to a mounting surface. The mounting surface may be a wall, a ceiling, or a piece of furniture. The means for securing the portable apparatus to the wall includes, for example, an adhesive; a hook sized to receive a nail or corresponding hook secured to the mounting surface; or a hole defined within the second surface and sized to receive a hook or nail secured to the mounting surface. The adhesive may be putty, glue, or an adhesive strip. Desirably, the adhesive is a limited stick adhesive adapted for repeated removal and repositioning of the substrate on the mounting surface. The substrate may be at least two feet in length and at least two feet in width. In one embodiment, the first and second surfaces are substantially planar, however, the first surface may be textured. The substrate may include a carrying hole defined therein. Alternatively, the substrate may include a handle, wherein the handle is attached to the substrate or is a scored punch-out within the substrate. The substrate may include a perforation line, a fold line, or a scored line defined across the substrate, wherein the substrate is adapted to be folded along the perforation line, the fold line, or the scored line to form an angled configuration of the substrate. The substrate may include at least one perforation line extending substantially therethrough, wherein the substrate is adapted to be separated into at least two smaller substrates upon a tearing along the at least one perforation line. The substrate may be divided into two or more sections connected to each other by one or more hinges. The substrate may include an area for textually identifying the paint color, finish, technique, or texture applied on the substrate. The second surface may include a stand for propping the substrate on a substantially horizontal surface.

The present invention also includes a method for visualizing and practicing a paint color, finish, technique, or texture. The method includes the steps of (a) applying a paint color, finish, technique, or texture to a first surface of a substrate, wherein the first surface includes a primer coating; (b) textually identifying onto the substrate the paint color, finish, technique, or texture applied thereto; (c) securing the substrate to a first portion of a mounting surface; (d) removing the substrate from the mounting surface; and (e) securing the substrate to a second portion of the mounting surface. If the substrate includes a perforation line, a fold line, or a scored line defined across the substrate, then the substrate may be folded along the perforation line, the fold line, or the scored line to form an angled configuration of the substrate.

The present invention allows a consumer, decorator or painter to create sample colors (e.g., red, blue), finishes (e.g., satin, flat), techniques (e.g., sponging, rag rolling), and textures (e.g., spackled, Venetian plaster) on a pre-primed, ready-to-paint test surface that is lightweight, portable and clean, yet large enough to provide adequate visual comparison perspectives. The clean and lightweight nature of the present invention facilitates easy portability to allow the consumer to take it to fabric, furniture or other interior decorating stores for color comparison-shopping. The present invention allows for a professional painter or decorator to easily bring color, finish or texture samples to a customer for review. Non-marking hanging points allow the product to be easily mounted on walls or ceilings for color comparison under varying light conditions and from different angles. A scored/perforated hinge allows the consumer, decorator or painter to wrap corners for corner light comparison or for comparing different colors, textures or finishes meeting at a corner. The product provides a pre-primed, paint-ready surface for practicing color, finish or texture techniques while eliminating the need to practice on existing walls. This provides to the consumer a greater level of confidence in creativity and reducing the cost and anxiety associated with mistakes. The present invention will reduce the number of color, finish and texture mistakes made by consumers, thereby reducing the total cost of painting. Unlike gypsum board, which is considered a construction material and in many communities is not easily disposable with normal household waste, the present invention is easily disposable and does not typically require special waste-removal provisions. The product offers room-to-room mobility for color comparison.

These and other advantages of the present invention will be understood from the following description of the preferred embodiments, taken with the accompanying drawings, wherein like reference numerals represent like elements throughout.

DETAILED DESCRIPTION OF THE INVENTION

Figure 1:
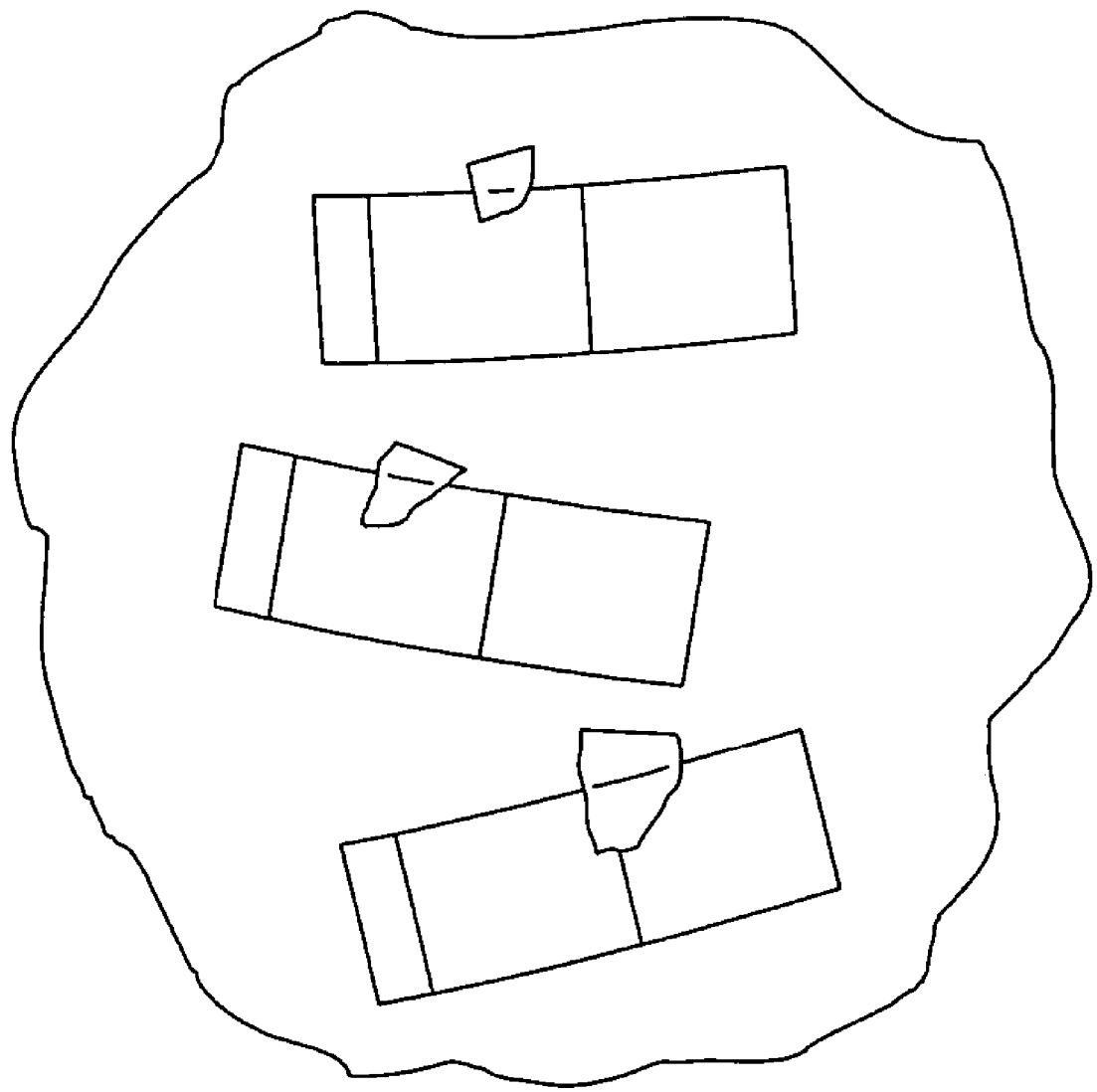
FIG. 1 is a prior art depiction of paint chips taped to a wall.

For purposes of the description hereinafter, spatial or directional terms shall relate to the invention as it is oriented in the drawing figures. However, it is to be understood that the invention may assume various alternative variations, except where expressly specified to the contrary. It is also to be understood that the specific apparatus illustrated in the attached drawings, and described in the following specification, is simply an exemplary embodiment of the invention. Hence, specific dimensions and other physical characteristics related to the embodiments disclosed herein are not to be considered as limiting, unless otherwise indicated. The present invention will now be described with reference to the accompanying figures.

Figure 2:
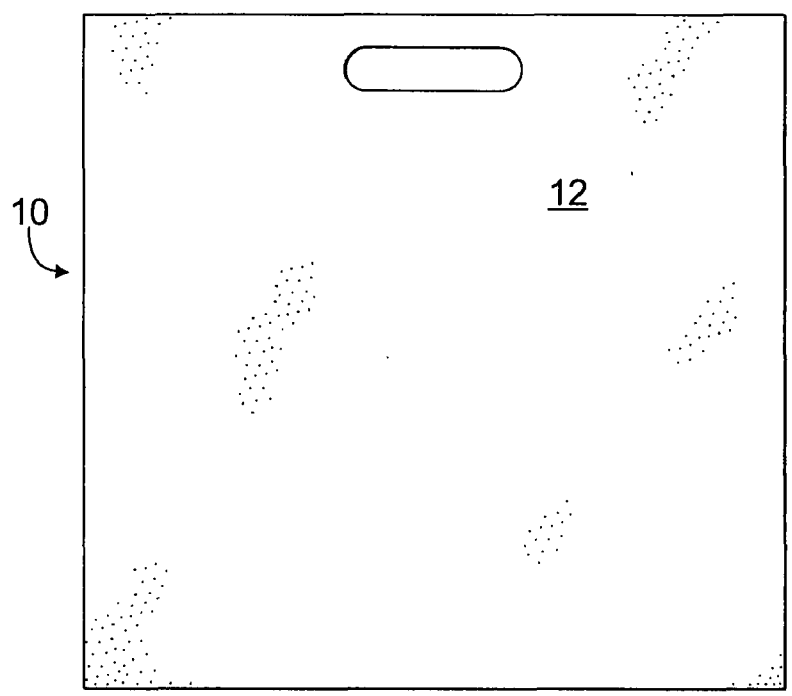
FIG. 2 is a front plan view of a portable apparatus for visualizing and/or practicing a paint color, finish, technique, or texture in accordance with the present invention.
Figure 3:
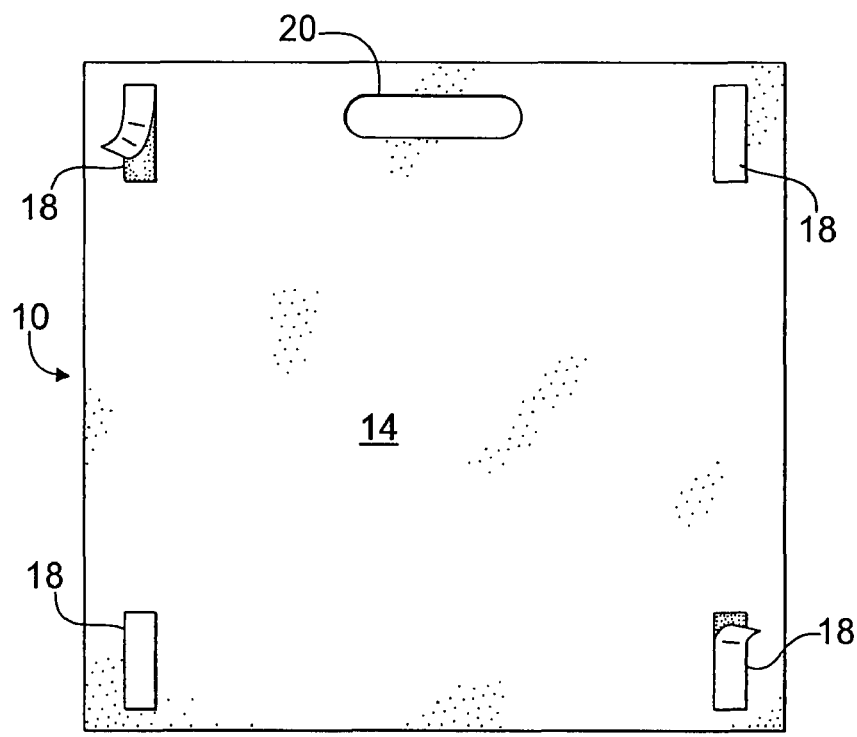
FIG. 3 is rear plan view of the portable apparatus shown in FIG. 2.
Figure 4:
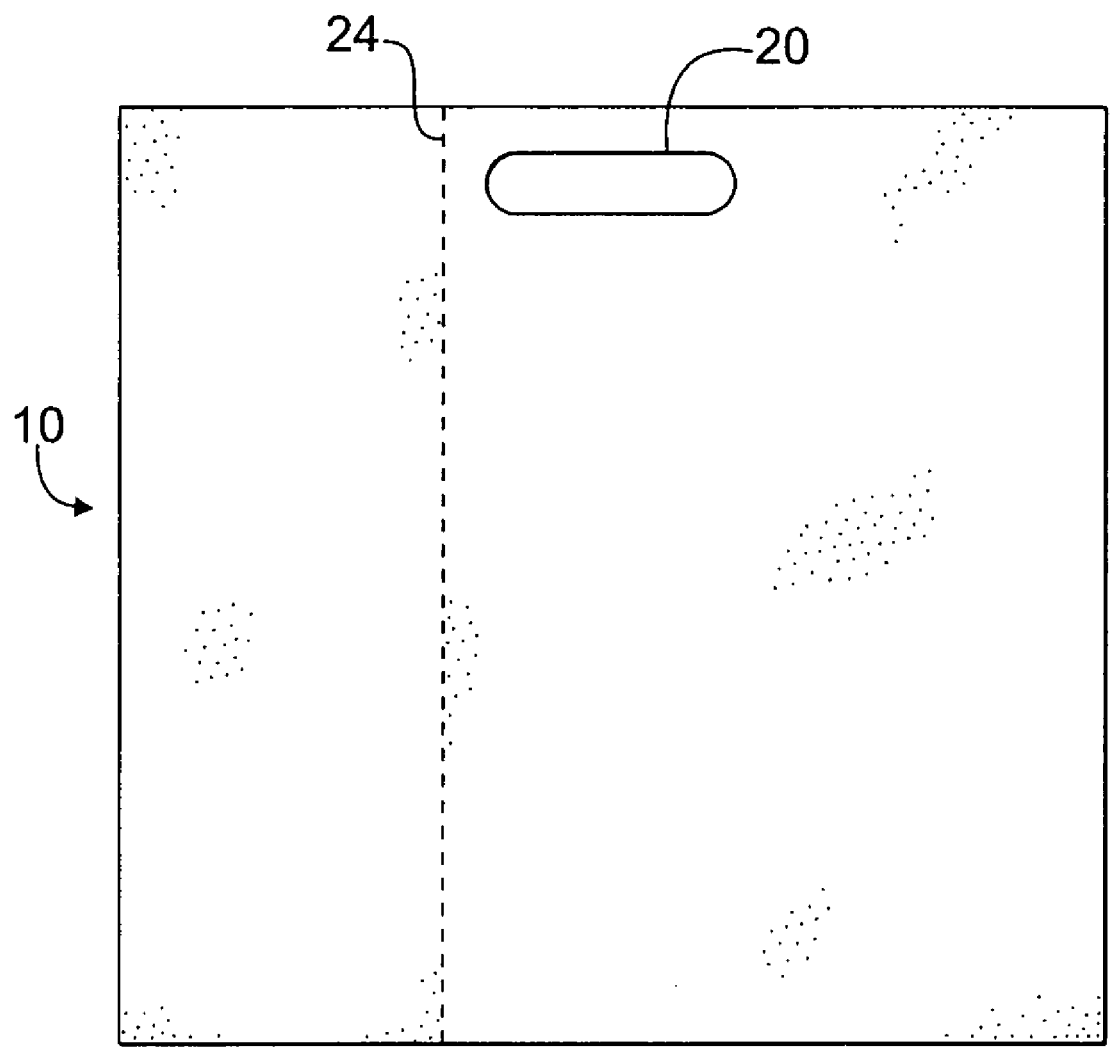
FIG. 4 is a front plan view of the portable apparatus shown in FIG. 2 being scored.
Figure 5:
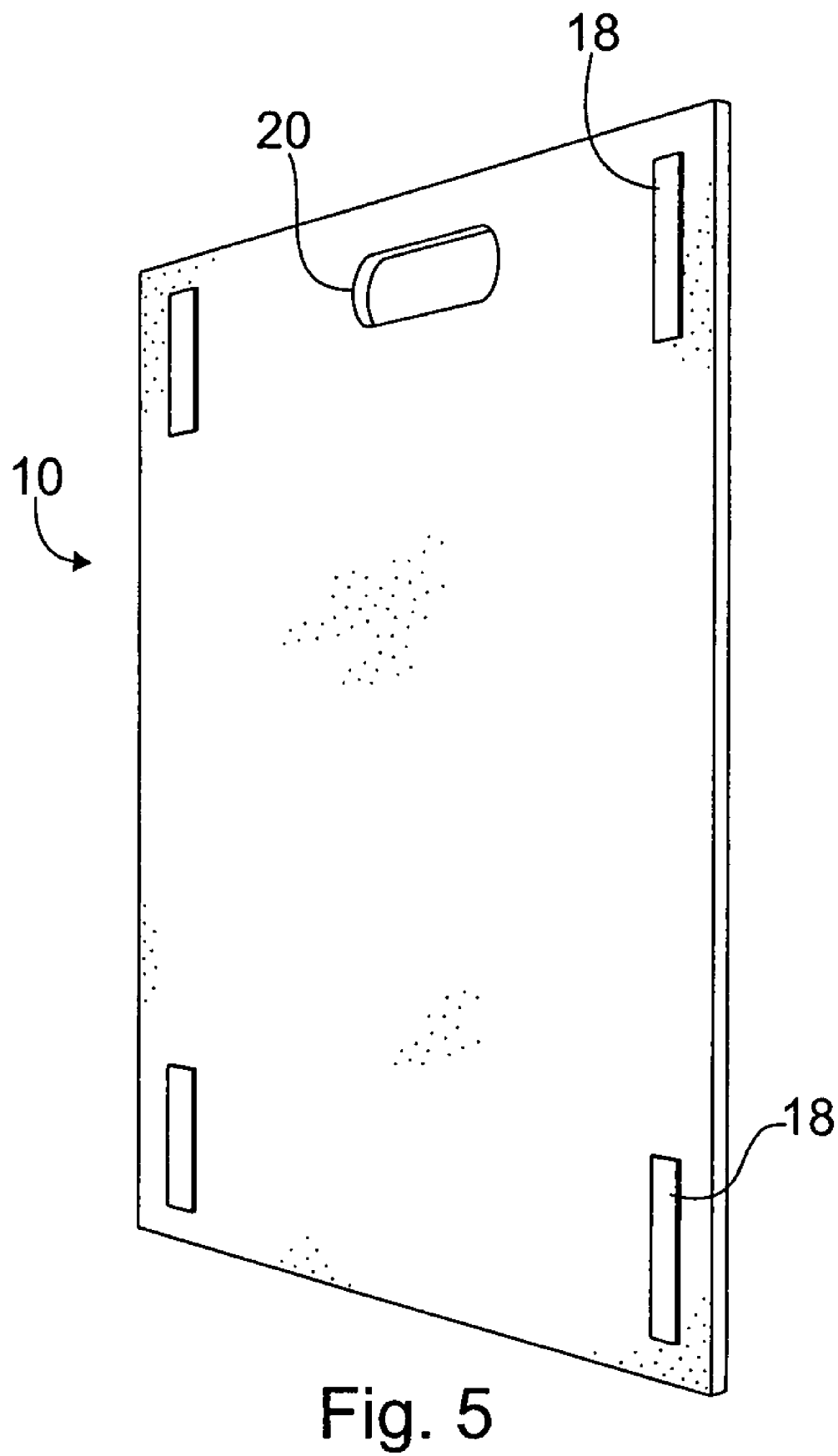
FIG. 5 is a side perspective view of the portable apparatus shown in FIG. 2.
Figure 6:
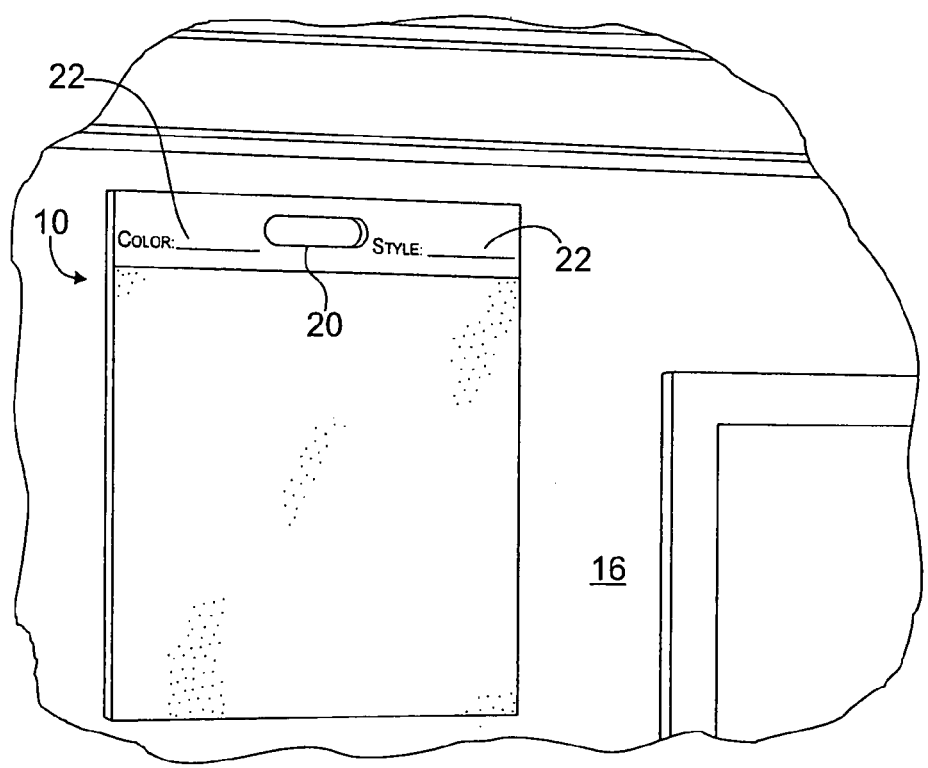
FIG. 6 depicts the portable apparatus with an exemplary paint finish secured to a first wall.
Figure 7:
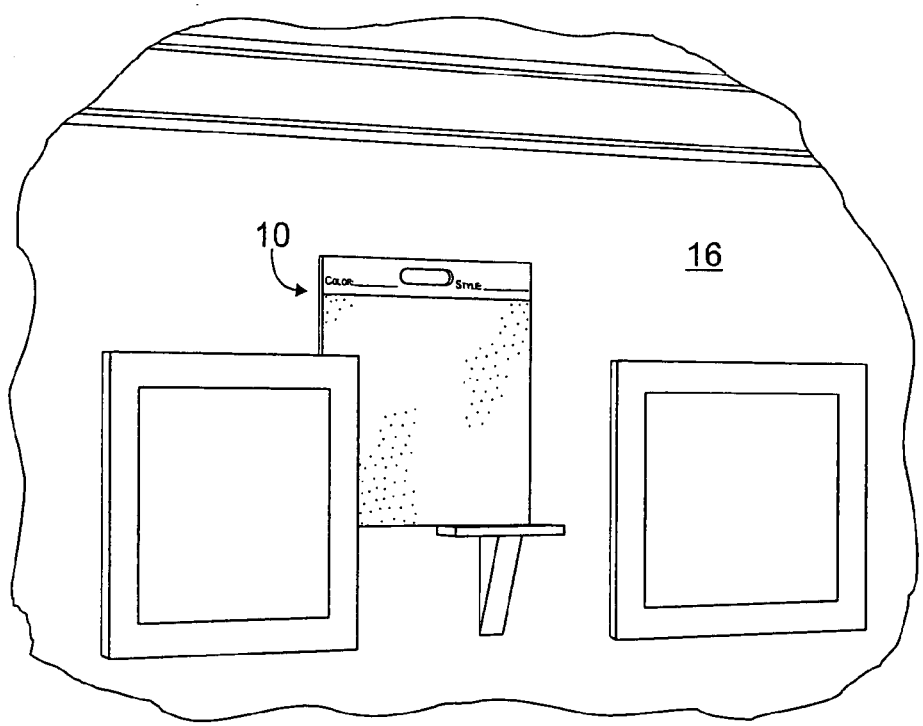
FIG. 7 depicts the portable apparatus positioned behind a painting and above a mantel.
Figure 8:
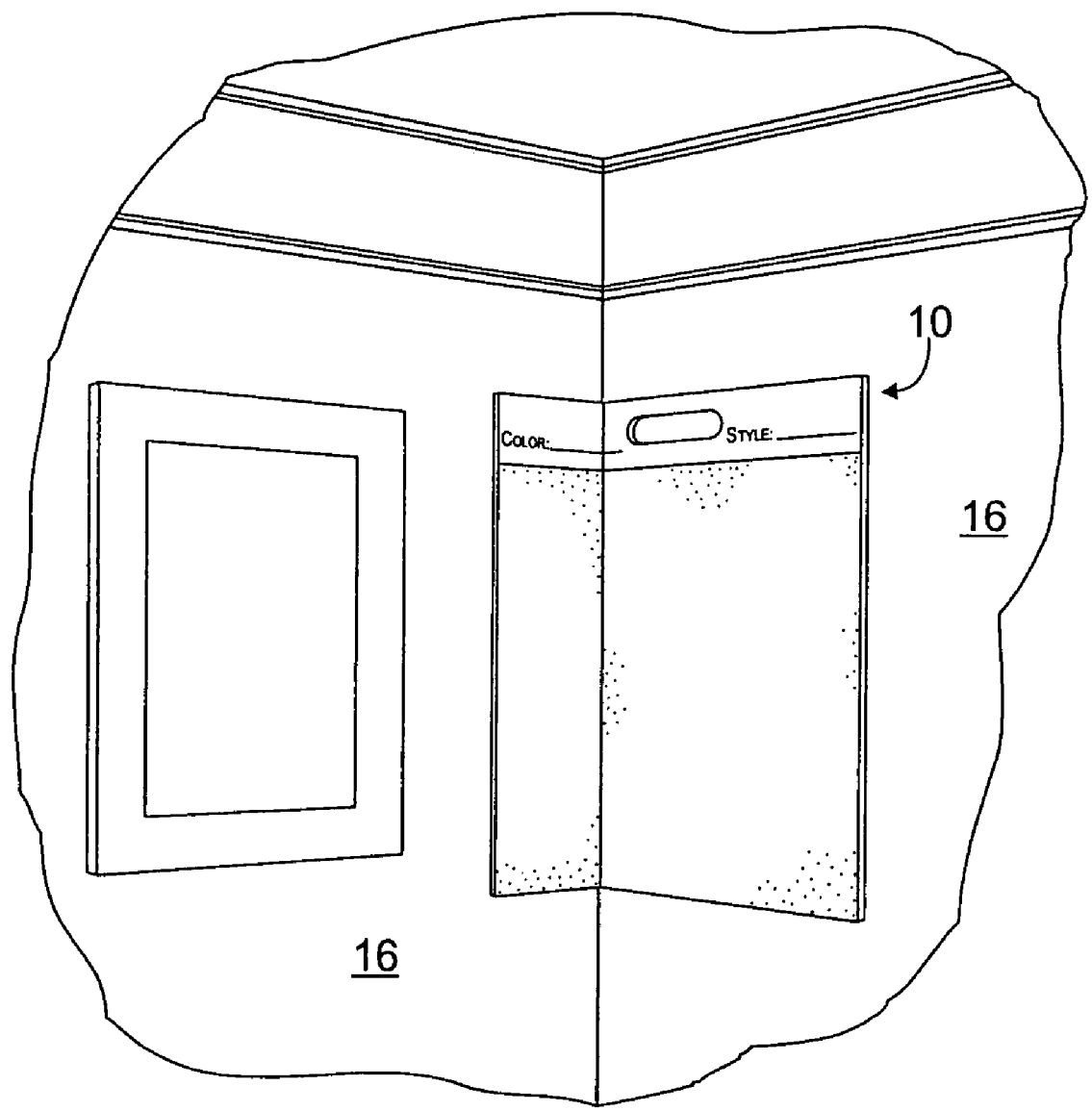
FIG. 8 depicts the portable apparatus secured to two walls and spanning the intersecting corner thereof.

With reference to FIGS. 2-8, the present invention is a portable, pre-primed, paint-ready apparatus for visualizing and/or practicing a paint color, finish, technique, or texture. In a desirable embodiment, the apparatus is a substrate 10 having a first surface 12 and a second surface 14. Desirably, the second surface 14 is substantially parallel with and opposite to the first surface 12. Furthermore, the substrate 10 is envisioned to be a rectilinear, substantially planar surface element constructed of any suitable lightweight, easily disposable material, such as fiber board. Other suitable, but not limiting materials may be paper, canvas, plastic cardboard, and poster board. It is to be understood that these materials may impart different properties on the substrate 10. For example, the substrate may embody a flexible, rigid, or semi-rigid construction. The substrate 10 may be of various dimensions. For example, the substrate 10 may be at least two feet in length by at least two feet in width, however, any suitable dimension may be used, especially in light of various uses of the substrate 10.

Either one or both surfaces 12, 14 of the substrate 10 may be primer coated to allow a paint color, finish, technique, or texture to adhere thereto. Exemplary paint may include, but is not limited to latex paint, water-based lacquer paint, or oil paints. Either one or both surfaces 12, 14 of the substrate 10 may be pre-textured to simulate different surface textures. The substrate 10 may be selected to have the characteristics of the intended surface of application. For example, the substrate 10 may integrate an element of a wood grain if the applied paint is to be used on a wooden surface. The substrate may also embody similar absorptive properties associated with the surface to be painted. Other textured materials include, but is not limited to stucco, concrete, drywall, plaster, paper, glass, metal, and fabric.

The substrate 10 may include various means for securing the substrate 10 to a mounting surface 16. It is to be understood that the term "mounting surface" refers to the surface on which a paint color, finish, technique, or texture is being considered. Exemplary mounting surfaces include, but are not limited to a wall, a ceiling, or a piece of furniture. The securing means are intended to temporarily secure the substrate 10 to the mounting surface without necessarily damaging or marking the existing surface. To this end, some suitable securing means include an adhesive 18; a hook sized to receive a nail or corresponding hook secured to the mounting surface 16; and a hole (not shown) defined within the second surface 14 and sized to receive a hook or nail secured to the mounting surface 16. Examples of adhesives include putty, glue, an adhesive strip, and an adhesive backing. These types of adhesives are desirably a limited stick adhesive adapted for repeated removal and repositioning of the substrate 10 on the mounting surface 16. It is to be understood that more than one securing means or type thereof may be used. Desirably, these securing means are situated on the back or second surface 14 of the substrate 10, however, they may be situated on the first surface 12. Furthermore, the securing means may be placed in any suitable position on the substrate 10.

The substrate 10 may include a punched-out or cut-out handle or hole 20 along an edge or any other suitable area of the substrate 10. Alternatively, one or more handles may extend from or may be attached to the substrate 10. The substrate 10 may include multiple scores or perforations that allow the individual to separate, by tearing, for example, the substrate 10 into multiple test sample areas or surfaces. It is to be understood that each of these test sample areas may have their own securing means associated therewith.

The substrate 10 may include one or more designated areas 22 for allowing an individual to visually indicate the paint color, finish, technique, or texture that has been applied to the substrate 10. Alternatively, the substrate 10 may be distributed with stickers that provide a similar visual indication function as would writing directly on the substrate 10.

The substrate 10 may have a fold line, be scored, or have a perforation line 24 defined across the substrate 10 for purposes of arranging two predefined portions of the substrate 10 in an angled relation (e.g., perpendicular) to each other. In an alternative embodiment, the two predefined portions of the substrate 10 may be hinged to each other. This is conducive to having the substrate 10 "wrap" around corners or curved walls, or having the substrate 10 freely stand on its own. In an alternative embodiment, the second surface 14 of the substrate 10 may include a picture-frame-type triangle or stand for purposes of propping up the substrate 10.

It is to be understood that the substrate 10 with the sample paint or finish applied thereon may be displayed in connection with various surfaces and wall configurations, wall fixtures and flooring. Furthermore, it is to be understood that the substrate 10 may be for single or multi-use. In a multi-use application, the substrate 10 may be painted over again with a different paint or may be coated with a new primer coating by the individual.

A method for visualizing and practicing a paint color, finish, technique, or texture first includes the step of applying a paint color, finish, technique, or texture to a first surface 12 of the substrate 10. Then, the paint color, finish, technique, or texture applied to the substrate 10 may be textually identified onto the substrate 10. Thereafter, the substrate 10 may be secured to a first portion of a mounting surface 16. It is to be understood that the substrate 10 may be removed from and repositioned on the mounting surface 16 from a first portion of the mounting surface 16 to a second portion of the mounting surface 16. Optionally, the substrate 10 may be folded along the perforation line, the fold line, or the scored line 24 to form an angled configuration of the substrate 10. This would allow the substrate 10 to wrap around a wall so that the paint color, finish, technique, or texture can be visualized in the context of a corner or a curved section of the mounting surface 16.

The invention has been described with reference to the desirable embodiments. Obvious modifications and alterations will occur to others upon reading and understanding the preceding detailed description. It is intended that the invention be construed as including all such modifications and alterations insofar as they come within the scope of the appended claims or the equivalents thereof.

The invention claimed is:

1. A method for visualizing and practicing a paint color, finish, technique, or texture, the method comprising the steps of:

obtaining a plastic substrate from an entity other than a consumer, wherein the plastic substrate is absent of any paint color, finish, technique, or texture;

applying by the consumer a paint color, finish, technique, or texture to the first surface of the plastic substrate, wherein the second surface of the substrate includes a limited stick adhesive for repeated removal and repositioning of the substrate on a mounting surface;

securing by the consumer the substrate to a first portion of the mounting surface via the adhesive of the second surface;

removing by the consumer the substrate from the mounting surface; and securing by the consumer the substrate to a second portion of the mounting surface via the adhesive of the second surface.

2. The method of claim 1, wherein the substrate includes a perforation line, a fold line, or a scored line defined across the substrate.

3. The method of claim 2, further comprising the step of folding the substrate along the perforation line, the fold line, or the scored line to form an angled configuration of the substrate.

4. The method of claim 1, wherein the limited stick adhesive is putty, glue, or an adhesive strip.

5. The method of claim 1, wherein the substrate is 12 inches in length and 12 inches in width or 24 inches in length and 16 inches in width.

6. The method of claim 1, wherein the first and second surfaces are substantially planar.

7. The method of claim 1, wherein the first surface is textured.

8. The method of claim 1, further comprising the step of textually identifying onto the substrate the paint color, finish, technique, or texture applied thereto.

9. The method of claim 1, wherein the mounting surface is a wall, a ceiling, or a piece of furniture.

* * * * *